United States Patent Office 3,560,397
Patented Feb. 2, 1971

3,560,397
PHOTOLUMINESCENT PHOSPHORS
Frank J. Avella, Flushing, N.Y., assignor to General Telephone and Electronics Laboratories, Inc.
No Drawing. Filed Sept. 27, 1965, Ser. No. 490,706
Int. Cl. C09k 1/44
U.S. Cl. 252—301.1
13 Claims

ABSTRACT OF THE DISCLOSURE

A family of phosphor compositions having the formula $M^{2+}_{0.5}RM^{4+}_{0.5}VO_4$ where $M^{2+}$ is a divalent element selected from the group consisting of calcium, strontium, cadmium, and zinc, $M^{4+}$ is a tetravalent element selected from the group consisting of zirconium and thorium and R is a rare earth activator. The phosphors emit red light under ultraviolet excitation and may be used for color correction in high pressure mercury lamps.

---

This invention relates to phosphors which emit light in response to ultraviolet excitation and in particular to rare earth activated vanadate phosphors having divalent and tetravalent cations incorporated into the host lattice.

In copending patent application Ser. No. 334,565, filed Dec. 30, 1963, now abandoned by Albert K. Levine and Frank C. Palilla, there is disclosed a family of phosphors having the empirical formula $M^{3+}VO_4$:R, where $M^{3+}$ is a trivalent metal such as yttrium, gadolinium or lutetium and R is an activating element selected from the rare earth lanthanide series. One of the most useful phosphors in this family is europium activated yttrium vanadate which has a relatively intense red (619 nanometers) emission when excited by an ultraviolet light source.

I have discovered a new series of ultraviolet responsive phosphors which are obtained by substituting certain divalent-tetravalent cation pairs for the trivalent cation in the crystal structure $M^{3+}VO_4$ to form a zircon lattice $M^{2+}_{0.5}M^{4+}_{0.5}VO_4$ where $M^{2+}$ and $M^{4+}$ represent divalent and tetravalent cations respectively. Activation with a trivalent rare earth ion can then be effected without need for charge compensation by partial replacement of both cations to produce a phosphor having the empirical formula $M^{2+}_{0.5(1-x)}R_xM^{4+}_{0.5(1-x)}VO_4$ where $x$ is the rare earth activator concentration in gram atoms. Such phosphors emit red light and may be used as color correctors in high pressure mercury lamps to compensate for the lack of a red component in the mercury arc emission.

In general, the choice of divalent and tetravalent cations is determined by their ionic radii, the radius of each cation being selected to approximate that of the rare earth in order to produce an orthovanadate phosphor crystallized with the zircon structure. However, I have found that only certain combinations of divalent and tetravalent cations with specific trivalent rare earth activators produce phosphors having satisfactory emission under ultraviolet excitation. When the activator is trivalent Eu, this emission spectrum is peculiar to $Eu^{3+}$ coordinated in a zircon type crystal lattice and is, therefore, essentially the same as the spectrum obtained from the aforementioned $M^{3+}VO_4$:R compounds, where R equals Eu as exemplified by $YVO_4$:Eu. More specifically, photoluminescence is obtained when the divalent cation $M^{2+}$ is calcium, the tetravalent cation $M^{4+}$ is zirconium and the activator R is either europium or samarium. Photoluminescence is also obtained when the divalent cation $M^{2+}$ is selected from the group consisting of calcium, strontium, cadmium and zinc, the tetravalent cation $M^{4+}$ is thorium and the rare earth activator is europium. In addition, it has been found that orthovanadates containing the cations zinc and thorium are photoluminescent when activated with samarium.

When europium is used as the activator in these phosphors, optimum photoluminescence is obtained when the concentration is 0.15 gram atom whereas the optimum concentration of samarium in the samarium activated phosphor is 0.01 gram atom.

The brief introduction to the present invention will be more fully understood from the following examples.

EXAMPLE I

A photoluminescent phosphor $Ca_{0.425}Eu_{0.150}Zr_{0.425}VO_4$ was prepared by mixing 4.36 grams $CaCO_3$, 2.708 grams $Eu_2O_3$, 5.36 grams $ZrO_2$ and 12.0 grams $NH_4VO_3$ and placing the mixture in an open platinum crucible. The crucible was placed in an electric resistance furnace and fired in air at about 540° C. for approximately 5 hours. The sample was then ground with a mortar and pestle, returned to the crucible and fired a second time in air at a temperature in the range 750° to 800° C. for about 16 hours. The sample was cooled and then slurried in a hot dilute base such as a 10% aqueous solution of NaOH to remove any excess vanadium oxide. Next the sample was washed with hot distilled water to a neutral pH and then dried at approximately 110° C. The resulting phosphor was a powder having an off-white body color.

The phosphor was excited by the unfiltered radiation from a G.E. type S–4 100 watt high pressure mercury lamp having a principal emission at 366 nanometers, the emission from the phosphor being detected with an RCA type 1P21 photocell through a Kodak Wratten 106 filter. It was found that the total luminosity was about 88 percent of that obtained from $Y_{0.95}Eu_{0.05}VO_4$ under the same condition of excitation and response measurement. Additional samples of $Ca_{0.05(1-x)}Eu_xZr_{0.5(1-x)}VO_4$ were prepared wherein $x$ was varied between 0.01 and 0.26. In each case the principal emission peak occurred at 619 nanometers although the luminosity was somewhat less than at the optimum europium concentration where $x=0.15$.

EXAMPLE II

A red-emitting photoluminescent phosphor $$Ca_{0.425}Eu_{0.150}Th_{0.425}VO_4$$

was prepared by mixing 0.612 gram CaO, 0.677 gram $Eu_2O_3$, 6.01 grams $Th(NO_3)_4 \cdot 4H_2O$ and 3.00 grams $NH_4VO_4$ and then following the procedure of Example I.

When the photoluminescence of the phosphor was measured by the method described in Example I it was found that its relative luminosity was about 89 percent that of the standard $Y_{.95}Eu_{0.05}VO_4$ with its principal emission at 619 nanometers.

Other samples of $Ca_{0.5(1-x)}Eu_xTh_{0.5(1-x)}VO_4$ were prepared in which the europium concentration $x$ was as low as 0.10 gram atom, the luminosity being reduced somewhat from the optimum value of $x=0.15$.

EXAMPLE III

A phosphor was prepared in accordance with Example II except that the calcium oxide was omitted from the mixtures and 1.67 grams SrO substituted therefor. The resulting red-emitting phosphor $Sr_{0.425}Eu_{0.150}Th_{0.425}VO_4$ had a relative luminosity of 86 percent that of the standard. Photoluminescence was obtained when the europium concentration was as low as 0.05 gram atom but the optimum was 0.15 gram atom.

EXAMPLE IV

A phosphor was prepared in accordance with Example II except that the calcium oxide was omitted from the mixture and 1.40 grams CdO substituted therefor. The resulting phosphor $Cd_{0.425}Eu_{0.150}Th_{0.425}VO_4$ had a relative luminosity which was 96 percent of the standard.

EXAMPLE V

A red-emitting phosphor was prepared in accordance with Example II except that the calcium oxide was replaced with 0.884 gram ZnO. The resulting phosphor $$Zn_{0.425}Eu_{0150}Th_{0.425}VO_4$$

had a luminosity equal to that of the standard $$Y_{0.95}Eu_{0.65}VO_4$$

EXAMPLE VI

A red-emitting photoluminescent phosphor $$Ca_{0.4975}Sm_{0.005}Zr_{0.4975}VO_4$$

was prepared by mixing 1.28 grams $CaCo_3$, 0.0224 gram $Sm_2O_3$, 1.58 grams $ZrO_2$ and 3.00 grams $NH_4VO_3$ and then following the procedure of Example I.

Red photoluminescence characterstic of $Sm^{3+}$ emission was obtained but of a much lower order than from the europium-activated compound.

An additional sample was prepared by the same method wherein the amount of samarium was 0.10 gram atom. The photoluminescence response was more intense than with the sample prepared with 0.005 gram atom of samarium.

EXAMPLE VII

A phosphor having the composition $$Zn_{0.4975}Sm_{0.005}Th_{0.4975}VO_4$$

was prepared by mixing 1.03 grams ZnO, 0.0224 gram $Sm_2O_3$, 7.04 grams $Th(NO_3)_4 \cdot 4H_2O$ and 3.00 grams $NH_4VO_3$ and then following the procedure of Example I. The resulting phosphor exhibited red photoluminescence similar in intensity to phosphors of Example VI.

While typical examples have been illustrated and described in detail, it is to be understood that all matter contained therein shall be interpreted as illustrative and not in a limiting sense.

What is claimed is:

1. A phosphor composition having the empirical formula $M^{2+}_{0.5(1-x)}R_xM^{4+}_{0.5(1-x)}VO_4$ where $M^{2+}$ is a divalent element selected from the group consisting of calcium, strontium, cadmium, and zinc, $M^{4+}$ is a tetravalent element selected from the group consisting of zirconium and thorium, and R is a rare earth activator selected from the group consisting of europium and samarium, the value of $x$ being selected to produce red-emitting photoluminescence when said phosphor composition is excited by ultraviolet radiation, said value of $x$ being less than 1.

2. A phosphor composition having the empirical formula $M^{2+}_{0.5(1-x)}R_xM^{4+}_{0.5(1-x)}VO_4$ where $M^{2+}$ is calcium, $M^{4+}$ is zirconium and R is a rare earth element selected from the group consisting of europium and samarium, the value of $x$ being selected to produce red-emitting photoluminescence when said phosphor composition is excited by ultraviolet radiation, said value of $x$ being less than 1.

3. A phosphor composition as defined by claim 2 wherein R is europium and $x$ has a value between 0.01 and 0.26.

4. A phosphor composition as defined by claim 2 wherein R is samarium and $x$ has a value of approximately 0.005.

5. A phosphor compositon as defined by claim 2 wherein R is samarium and $x$ has a value of approximately 0.005.

6. A phosphor composition having the empirical formula $M^{2+}_{0.5(1-x)}R_xM^{4+}_{0.5(1-x)}VO_4$ where $M^{2+}$ is a divalent element selected from the group consisting of calcium, strontium, cadmium and zinc, $M^{4+}$ is thorium and R is europium, the value of $x$ being selected to produce red-emitting photoluminescence when said phosphor composition is excited by ultraviolet radiation, said value of $x$ being less than 1.

7. A phosphor composition as defined by claim 6 wherein $M^{2+}$ is calcium and $x$ has a value of approximately 0.15.

8. A phosphor composition as defined by claim 6 wherein $M^{2+}$ is strontium and $x$ has a value of approximately 0.15.

9. A phosphor composition as defined by claim 6 wherein $M^{2+}$ is cadmium.

10. A phosphor composition as defined by claim 6 wherein $M^{2+}$ is cadmium and $x$ has a value of approximately 0.15.

11. A phosphor composition as defined by claim 6 wherein $M^{2+}$ is zinc and $x$ has a value of approximately 0.15.

12. A phosphor composition having the empirical formula $M^{2+}_{0.5(1-x)}R_xM^{4+}_{0.5(1-x)}VO_4$ where $M^{2+}$ is zinc, $M^{4+}$ is thorium and R is a rare earth element selected from the group consisting of europium and samarium, the value of $x$ being selected to produce red-emitting photoluminescence when said phosphor composition is excited by ultraviolet radiation, said value of $x$ being less than 1.

13. A phosphor composition as defined by claim 12 wherein R is samarium and $x$ has a value of approximately 0.005.

References Cited

Brixner et al.: (I)—On the Luminescent Properties of the Rare Earths Vanadates—Journal of the Electrochemical Society, vol. 112, No. 1, January 1965, pp. 70–74.

Brixner et al.: (II) — Calcium Orthovanadate $Ca_3(VO_4)_2$—A New Laser Host, Ibid, vol. 112, No. 3, March 1965, pp. 303–308.

Brixner et al.: (III)—Note on Calcium Orthovanadate, Ibid, vol. 111, No. 7, July 1964, pp. 873–874.

TOBIAS E. LEVOW, Primary Examiner

R. D. EDMONDS, Assistant Examiner

U.S. Cl. X.R.

252—301.4, 301.6